United States Patent [19]
Blakeslee et al.

[11] 3,709,615
[45] Jan. 9, 1973

[54] INTEGRATING LIGHT METER WITH MOVABLE METER MECHANISM

[75] Inventors: Thomas R. Blakeslee, Sherman Oaks, Calif.; Erwin Bryll, Deerfield, Ill.

[73] Assignee: Calumet Photographic, Inc.

[22] Filed: Feb. 28, 1969

[21] Appl. No.: 803,169

[52] U.S. Cl. ........... 356/224, 356/215, 356/223, 356/225, 356/227
[51] Int. Cl. .......................... G01j 1/42, G01j 1/46
[58] Field of Search ...... 356/274, 202, 223, 203, 215; 95/10 C, 233

[56] References Cited

UNITED STATES PATENTS

| | | | |
|---|---|---|---|
| 2,045,797 | 6/1936 | Presser | 356/224 |
| 2,995,975 | 8/1961 | Balchunas et al. | 356/223 |
| 3,170,023 | 2/1965 | Barry et al. | 356/224 |
| 3,428,814 | 2/1969 | Doonan | 250/214 |
| 3,442,190 | 5/1969 | Erickson | 250/214 |
| 3,450,888 | 6/1969 | Spangler | 250/214 |
| 3,526,175 | 9/1970 | Reimann et al. | 95/10 |

*Primary Examiner*—Ronald L. Wibert
*Assistant Examiner*—Conrad Clark
*Attorney*—Hofgren, Wegner, Allen, Stellman & McCord

[57] ABSTRACT

An integrating light meter with a circuit which develops a signal representing the logarithm of the light being measured and utilizes a display having a linear f-number scale. The meter has two ranges, provided by physically moving the meter mechanism with relation to the scale indicia so that the range of movement of the pointer encompasses a different portion of the scale. The sensitivity of the meter is changed between ranges by a mask with an aperture therein which limits the light to the photocell.

8 Claims, 5 Drawing Figures

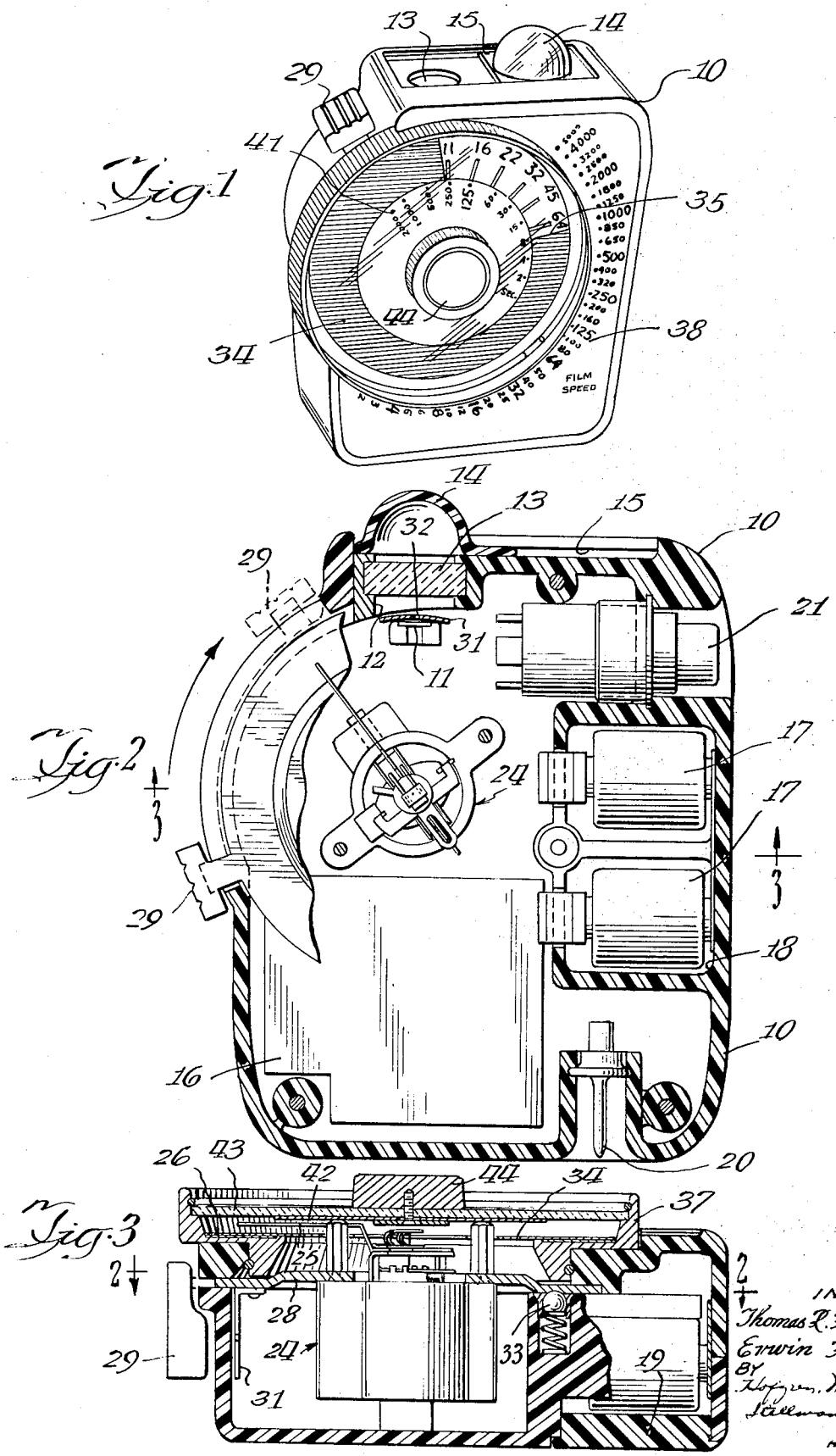

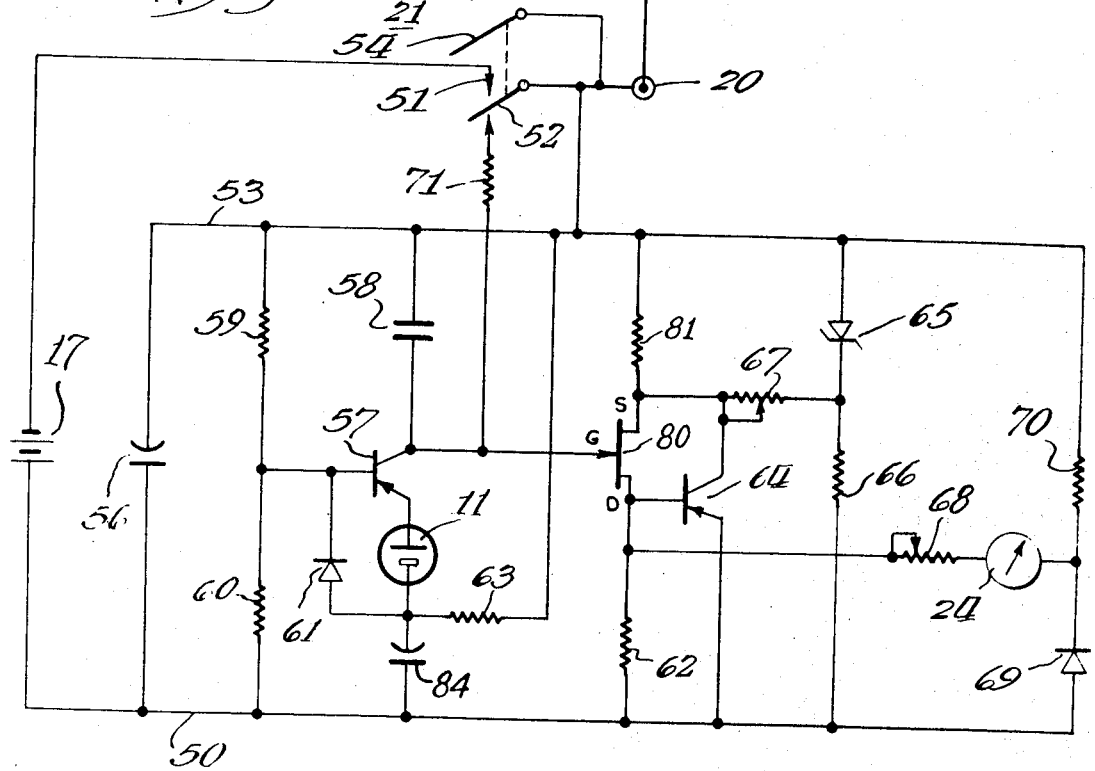

INTEGRATING LIGHT METER WITH MOVABLE METER MECHANISM

This invention relates to a light meter and more particularly to an integrating light meter for indicating directly the *f*-number or aperture opening to be used with a selected film and momentary or flash lighting.

When a picture is taken with a light flash, the duration of the light is only a fraction of the time the shutter of the camera is open and the intensity of the light is transient in nature starting at a low level, increasing to a maximum and then decreasing. The exposure of the film is determined by the total amount of light during the period the shutter is open and the size of the aperture used in the camera. In order to select the proper aperture opening for a given film speed, it is necessary to know how much light is received during the period the shutter is open. The total light may include continuous background light with the light generated by the flash. The measurement can be made by an integrating light meter which determines the total amount of light received during a period of time. Such meters are shown in Edgerton U.S. Pat. No. 2,588,368 and Thomas U.S. Pat. No. 3,049,050. The meter of the Thomas patent is a good example of some of the problems which are found in prior instruments. The meter there has a nonlinear scale with multiple ranges which is both difficult to read and subject to error if one reads the wrong set of indicia.

One feature of the invention is the provision of a light meter with a scale having an extent greater than the excursion of the meter indicator together with means for moving the meter relative to the scale. The sensitivity of the meter is changed to correspond with the meter-scale position. This affords multiple range operation without the duplication of scale indicia.

Another feature of the invention is that the photocell receiving the light to be measured is connected with a signal translating circuit which generates an output signal that varies linearly with the logarithm of the sensed light. This permits the *f*-number scale associated with the meter to be graduated linearly. More particularly, the circuit means includes a capacitor connected with the photocell for storing a voltage representing the integral of the light striking the photocell and an output transistor having base, emitter and collector electrodes, connected with the capacitor. The collector current of the transistor is directly proportional to the voltage on the capacitor and the meter is connected with the transistor to indicate the base to emitter voltage thereof.

A further feature is that the scale is an *f*-number scale adjustable with respect to the meter in accordance with film speed.

Yet another feature is that the light meter includes a photocell, a capacitor connected to the photocell for integrating the current therefrom, a timing circuit, a source of power and a double-throw switch having one position connecting the photocell and timing circuit with the source of power and a second position shorting the capacitor.

Further features and advantages will readily be apparent from the following specification and from the drawings, in which:

FIG. 1 is a perspective of a meter embodying the invention;

FIG. 2 is a broken longitudinal section taken generally along line 2—2 of FIG. 3 with the meter in the high range position;

FIG. 3 is a broken transverse section taken generally along line 3—3 of FIG. 2 with the meter in the low range position;

FIG. 4 is an elevation; and

FIG. 5 is a schematic diagram of the electrical circuit.

The invention as illustrated and described herein is embodied in an integrating light meter particularly for use in measuring the intensity of light flashes. The meter disclosed is especially intended and adapted for this use. Several of the features of the instrument, however, can be used in a continuous light indicator.

The purpose of the various features of the instrument will more readily be appreciated with a brief description of its operation. A photocell measures the intensity of light striking it during a period of time, as 1/125 second. The output of the photocell is integrated to indicate the total quantity of light during the time interval. This information, together with the sensitivity of the film, determines the *f*-number to be used. A meter has indicia representing the *f*-numbers and the position of the indicia with respect to the meter is adjusted in accordance with the film speed. The integrated light intensity signal is connected to the meter which indicates the *f*-number directly.

Referring now to FIGS. 1 through 4 of the drawings, the instrument is provided with a housing 10 of a size and shape to be held in the hand. A photocell 11 is mounted inside the housing adjacent a light inlet opening 12, closed by a suitable filter 13. A dome shaped translucent diffusor 14 is slidable in grooves 15 (only one shown) for movement into and out of a position overlying the light inlet opening 12. Housing 10 accommodates a circuit board 16 on which the various elements of the electrical circuit (not shown) are mounted. The electrical circuit is powered by a pair of batteries 17 located in a battery compartment 18 closed by a removable access panel 19.

Most films are relatively insensitive to infrared. Accordingly, the accuracy of the instrument is improved by selecting a material for filter 13 which attenuates infrared energy while passing that of shorter wavelength.

When a measurement is made of light reflected from a subject, the light inlet opening is pointed toward the subject and diffusor 14 is positioned away from the opening, as in FIG. 1. The diffusor is placed over the opening for a measurement of total incident light.

An electrical terminal 20 provides for connection of the meter to the flash control so that operation of the flash and the meter may be synchronized. The manually operable push button switch 21 actuates both the meter and the light flash, as will appear.

The meter indication is provided by a taut band moving coil meter mechanism 24 having a pivoted pointer 25 movable across an annular indicia plate 26 graduated in terms of *f*-number. The pointer of the meter mechanism has a limited range of movement, in the specific instrument illustrated, approximately 105°. If the instrument were designed to cover the entire range of stop openings with an 105° pointer movement, either the indicia graduations would be so close together as to be extremely difficult to read accurately or it would necessary to increase the length of the pointer and the instrument would be so large as to be unwieldy. It is known to provide multiple meter ranges electrically, as in the Thomas patent. Here, however, care must be exercised in reading the meter to make sure that one uses the scale for which the meter is set.

In accordance with the invention the entire range of stop opening indicia is provided as a single arcuate scale having an angular extent of the order of 180°. The meter mechanism 24 is mounted on a rotatable plate 28 which has a manual operator 29 extending outwardly through the housing 10 and accessible to the user. The plate and meter mechanism are rotatable through an angle of 75° relative to the scale and shifts the arc of movement of pointer 25 from one portion thereof to another. In the clockwise position of the plate 28, the meter pointer is associated with the higher number portion of the scale, FIG. 1. In the counterclockwise position, FIG. 4, the pointer is associated with the lower value readings of the scale. The sensitivity of the instrument is reduced for the higher value $f$-number range position by a mask 31 with a small aperture 32 therein, mounted on plate 28 and moved by it between the photocell 11 and light inlet opening 12, in the high range. Accurate location of plate 28 in its two positions is insured by a spring urged ball detent 33 shown seated in a recess in plate 28, FIG. 3. A similar recess is provided in the plate for its other position.

The position of the meter mechanism 24 and the portion of arcuate scale 26 being used is preferably indicated by a mask 34 overlying the arcuate indicia scale 26 and having a window 35 therein which exposes the portion of the scale encompassed by the range of movement of pointer 25. Mask 34 is mounted on and turns with rotatable plate 28. Mask 34 is preferably of a transparent colored plastic material so that the entire indicia scale may be visible through it.

Indicia scale 26 is mounted on a ring 37 which is rotatable on the housing 10. The position of the indicia with respect to the meter 24 takes into account the sensitivity of the film which is to be exposed so that the light measurement made by the meter indicates directly the $f$-number to be used. A scale of film speeds 38 (in terms of ASA number) is displayed on the wall of housing 10 around the periphery of ring 37. Marking dots 39 and 40 on the ring indicate the film speed selected. One of the marking dots is used for reflected light measurement and the other for incident light measurement. Individual calibration permits maximum sensitivity for both types of measurement. The marking dots are positioned on the ring as a part of the calibration procedure, utilizing a standard light source.

When the meter is used for determining the aperture opening to be used in a particular situation, the following procedure is used. First, the position of indicia scale 26 is adjusted in accordance with the film speed, using the appropriate marking dot. The flash control circuit (not shown) is connected with terminal 20. Switch 21 is then actuated, rendering the measuring circuit operative and flashing the light source. Pointer 25 moves to a position indicating the total amount of light received during the timing period and remains in this indicating position until the switch is released. If the meter indicates beyond the limit of the window 35 of transparent mask 34, the reading may not be accurate. If using the instrument on the low range and the indication is beyond the high limit of the mask, another reading should be taken on the high range. Conversely, if a reading is taken on the high range and the indication is below the low limit of the mask, the measurement should be repeated on the low range.

The use of a signal translation circuit (described below) which has an output that is logarithmically related to the light received by the photocell permits utilization of a linear scale which enables range changing in the manner described.

If it is desired to take a picture at a speed other than 1/125 second (as where continuous light provides all or a significant portion of the illumination of the scene to be photographed), the reading of the meter may be converted using scale 41 displayed on sheet 42 mounted on the inner surface of rotatable dial cover 43. Scale 41 is calibrated in terms of shutter speeds. After a reading is taken with the meter, the indication 1/125 is placed opposite the $f$-stop reading of the meter. The point on scale 41 corresponding with the shutter speed to be used is then located and the appropriate stop opening is adjacent thereto. An adjustment knob 44 provides for turning the dial plate 43 and indicia carrying sheet 42.

A preferred embodiment of an electrical circuit for converting the light energy striking the photocell 11 to an appropriate electrical signal, representing a logarithm of the light, for display by meter 24 is illustrated in FIG. 5. During the course of the description of this circuit, component values and type designations will be given for various elements. This specific disclosure is for the purpose of illustrating an operative embodiment of the circuit and many changes will be apparent to those skilled in the art.

The circuit is powered from battery 17, 11 volts, which is disconnected from the circuit except when double-pole, double-throw switch 21 is actuated. The positive terminal of battery 17 is connected with common conductor 50 while the negative terminal is connected to a fixed contact 51 of the switch. Upon actuation of the switch, movable contact 52 first engages fixed contact 51, connecting the common negative conductor 53 with the battery, initiating operation of the measuring and timing circuit, as will appear. Shortly after contact 52 engages contact 51, movable contact 54 engages contact 55, shorting the contact of the flash synchronizing terminal 20. This actuates the light flash.

A filter capacitor 56 is connected between the common positive and negative conductors 53 to reduce transients in the circuit.

Photocell 11 is connected with the emitter of transistor 57, 2N428, the collector of which is connected through integrating capacitor 58, 0.47 $\mu f$, with the negative conductor 53. Resistors 59, 100K, and 60, 150K, establish bias for the transistor of approximately 6 volts negative with respect to the positive terminal 50.

Diode 61, connected between the anode of photocell 11 and the base of transistor 57 establishes the emitter circuit at a negative potential equal to the base bias of the transistor.

The timing circuit for the meter is made up principally of resistor 63, 820 ohms, and capacitor 84, 12

μf, connected in series across the power source. The cathode of photocell 11 is connected with the emitter of transistor 57 and the anode is connected with the junction between register 63 and capacitor 84. When switch 21 is actuated, transistor 57 conducts, with the emitter-collector current being a direct function of the amount of light striking photocell 11. This current charges integrating capacitor 58, the voltage across the capacitor being a direct indication of the total light energy. At the same time, capacitor 84 is charged through resistor 63. As the voltage across capacitor 84 increases, the photocell transistor circuit is cut off. The time constant of the circuit is such that this requires 1/125 second, the timing period for the instrument.

A field effect transistor 80, type E101, has the source element connected through resistor 81, 1,500 ohms, with negative conductor 53. The drain element is connected through resistor 62, 6,800 ohms, with positive line 50. The gate element of transistor 60 is connected with capacitor 58. The impedance of the gate circuit is quite high and the drain of current from the capacitor 58 to the meter circuit is insignificant.

Transistor 64, 2N4248, has its collector element connected with the source element of transistor 80 and its base element connected with the drain of the field effect transistor. The emitter of transistor 64 is connected with negative line 50. The operating bias for transistors 80 and 64 is established by Zener diode 65, 1N751, and resistor 66, 4,700 ohms, connected across the power supply. The operating point of transistor 80 is set by potentiometer 67, connected between the source input of transistor 80 and Zener diode 65, at a lever such that the current through resistor 62 biases transistor 64 slightly into conduction.

As the voltage on capacitor 58 increases, the current through transistor 80 increases and the voltage drop across resistor 81 increases to follow the change in the voltage at the gate. Most of the current through resistor 81 is provided by transistor 64. Accordingly, the current through transistor 64 is proportional to the voltage across integrating capacitor 58 (and thus the total light energy).

The base-to-emitter voltage of transistor 64, i.e., the voltage across resistor 62, is proportional to the logarithm of the collector current of transistor 64. Thus, this voltage varies as the logarithm of the voltage across integrating capacitor 58, and represents the logarithm of the total quantity of light striking the photocell. The deflection of meter pointer 25 is proportional to the voltage across resistor 67 and is logarithmically related to the light sensed by photocell 11.

Meter 24 and series resistor 68 are connected in the diagonal of a bridge network. The signal translating circuit of transistors 80 and 64 forms one leg of the bridge circuit, with diode 69 in the opposite leg. Resistors 62 and 70 form the other two legs. The temperature characteristic of diode 69 is selected to complement the combined characteristics of transistors 60, 64, giving the instrument temperature stability.

The meter is calibrated on the low range. Potentiometer 67 controls linearity of the lower stop numbers while potentiometer 68 controls linearity of the higher stop numbers.

Meter 24 maintains indication so long as switch 21 is actuated. Upon release of the switch, the movable contacts return to the position shown in FIG. 5. The battery 17 is disconnected from the circuit and movable switch contact 52 completes a circuit through resistor 71, 47 ohms, discharging integrating capacitor 58. The instrument is then ready to take another reading.

We claim:

1. A light meter, comprising:
   a photocell for sensing received light;
   a signal translating circuit connected with the photocell, for developing an output signal proportional to the logarithm of the light sensed by the photocell;
   a meter connected with said circuit and having a moving indicator with limited excursion for providing an indication of said output signal;
   a continuous scale for said meter indicator having an extent greater than the excursion of the indicator;
   means for moving the meter relative to said scale; and
   means for controlling the sensitivity of the meter indication to light in accordance with the position of said meter relative to said scale.

2. The light meter of claim 1 in which the sensitivity of the meter indication is controlled by an aperture plate movable with relative movement between the meter and the scale.

3. The light meter of claim 1 in which said scale is an f-number scale adjustable with respect to said meter in accordance with film speed.

4. A photographic light meter, comprising:
   a housing;
   a photocell in said housing for sensing received light;
   a light measuring circuit having an input connected with said photocell and an output;
   a meter connected with the output of said circuit and having a pivoted indicator with limited excursion;
   a continuous annular indicia scale on said housing having an angular extent greater than the excursion of said pivoted meter indicator;
   means mounting said meter for rotation on said housing between a first position in which the excursion of the indicator is related to one portion of said scale and a second position in which the excursion of the indicator is related to another portion of said scale; and
   means for controlling the sensitivity of the meter to light in accordance with the position of the meter relative to said scale.

5. The meter of claim 4 wherein the housing has an inlet opening through which the light sensed by the photocell is received, and the means for controlling the sensitivity of the meter includes a mask with an aperture therethrough movable with rotation of the meter to a location between the light inlet opening and the photocell in one position of the meter.

6. The light meter of claim 4 in which said indicia scale represents f-numbers and is rotatable on said housing to establish a relative position between the meter and indicia in accordance with the speed of film to be used.

7. The light meter of claim 6 in which the film speed indicia is on the housing and has a pointer associated with the rotatable f-stop indicia scale.

8. The light meter of claim 4 having a mask with an opening therein through which a portion of the indicia scale is visible, said mask being movable with said meter.

* * * * *